(12) United States Patent
Couchman et al.

(10) Patent No.: US 7,714,797 B2
(45) Date of Patent: May 11, 2010

(54) PHASED ARRAY ANTENNA

(75) Inventors: Alan David Couchman, Hitchin (GB);
Adrian George Russell, Arlesey (GB)

(73) Assignee: Astrium Limited, Hertfordshire (GB)

( * ) Notice: Subject to any disclaimer, the term of this patent is extended or adjusted under 35 U.S.C. 154(b) by 949 days.

(21) Appl. No.: 10/585,098

(22) PCT Filed: Mar. 3, 2006

(86) PCT No.: PCT/GB2006/000782

§ 371 (c)(1),
(2), (4) Date: Jun. 30, 2006

(87) PCT Pub. No.: WO2006/092625

PCT Pub. Date: Sep. 8, 2006

(65) Prior Publication Data

US 2008/0143636 A1    Jun. 19, 2008

(30) Foreign Application Priority Data

Mar. 4, 2005 (EP) ................... 05251558
Mar. 4, 2005 (GB) ................... 0504521.6

(51) Int. Cl.
H01Q 1/28 (2006.01)
H01Q 3/02 (2006.01)
(52) U.S. Cl. ............... 343/881; 343/882; 343/915; 343/DIG. 2; 244/172.6
(58) Field of Classification Search ............ 343/840, 343/915, 916, 880–882; 244/172.6
See application file for complete search history.

(56) References Cited

U.S. PATENT DOCUMENTS

| 4,854,526 | A | | 8/1989 | Rochefort |
| 5,052,640 | A | | 10/1991 | Chang |
| 5,527,001 | A | * | 6/1996 | Stuart ............... 244/159.4 |

(Continued)

FOREIGN PATENT DOCUMENTS

JP    7-223597    8/1995

(Continued)

OTHER PUBLICATIONS

J.L. Blonstein, "*Communication Satellites, The Technology of Space Communications*", published 1987 by Heinemann, p. 147.

(Continued)

*Primary Examiner*—Michael C Wimer
(74) *Attorney, Agent, or Firm*—Buchanan Ingersoll & Rooney PC

(57) ABSTRACT

A phased array antenna for a telecommunications satellite, that is deployable from a retracted condition to a deployed condition when the satellite is on-station, comprising a base member of hexagonal form, and a plurality of deployable antenna panels stacked one on top of the other on the base member in the retracted condition, each antenna panel being connected to a respective side edge region of the base by means of a respective back flap hinge, and the hinges having pivot points that are offset relative to one another, such that the antenna panels can be hinged sequentially one after the other from the stick to a position in which each panel is adjacent a respective base side edge region to provide an extended flat two-dimensional area when deployed.

18 Claims, 15 Drawing Sheets

U.S. PATENT DOCUMENTS

| | | | |
|---|---|---|---|
| 5,641,135 | A | 6/1997 | Stuart et al. |
| 5,642,122 | A | 6/1997 | Lockie et al. |
| 5,927,654 | A | 7/1999 | Foley et al. |
| 6,505,381 | B1 | 1/2003 | Thomson et al. |
| 6,568,640 | B1 | 5/2003 | Barnett |
| 2002/0074458 | A1 | 6/2002 | Laraway et al. |

FOREIGN PATENT DOCUMENTS

| | | |
|---|---|---|
| WO | 94/02972 | 2/1994 |
| WO | 94/29927 | 12/1994 |

OTHER PUBLICATIONS

W.E. Hardy, "ERS-1 AMI Antennas: The Design and Development Experience", Marconi Space Systems, Portsmouth, United Kingdom, Proceedings of IGARSS '88 Symposium, Edinburgh, Scotland, Sep. 13-16, 1988, Ref. ESA SP-284 (IEEE 88CH2497-6), Published by ESA Publications Division, Aug. 1988, pp. 873-876.

\* cited by examiner

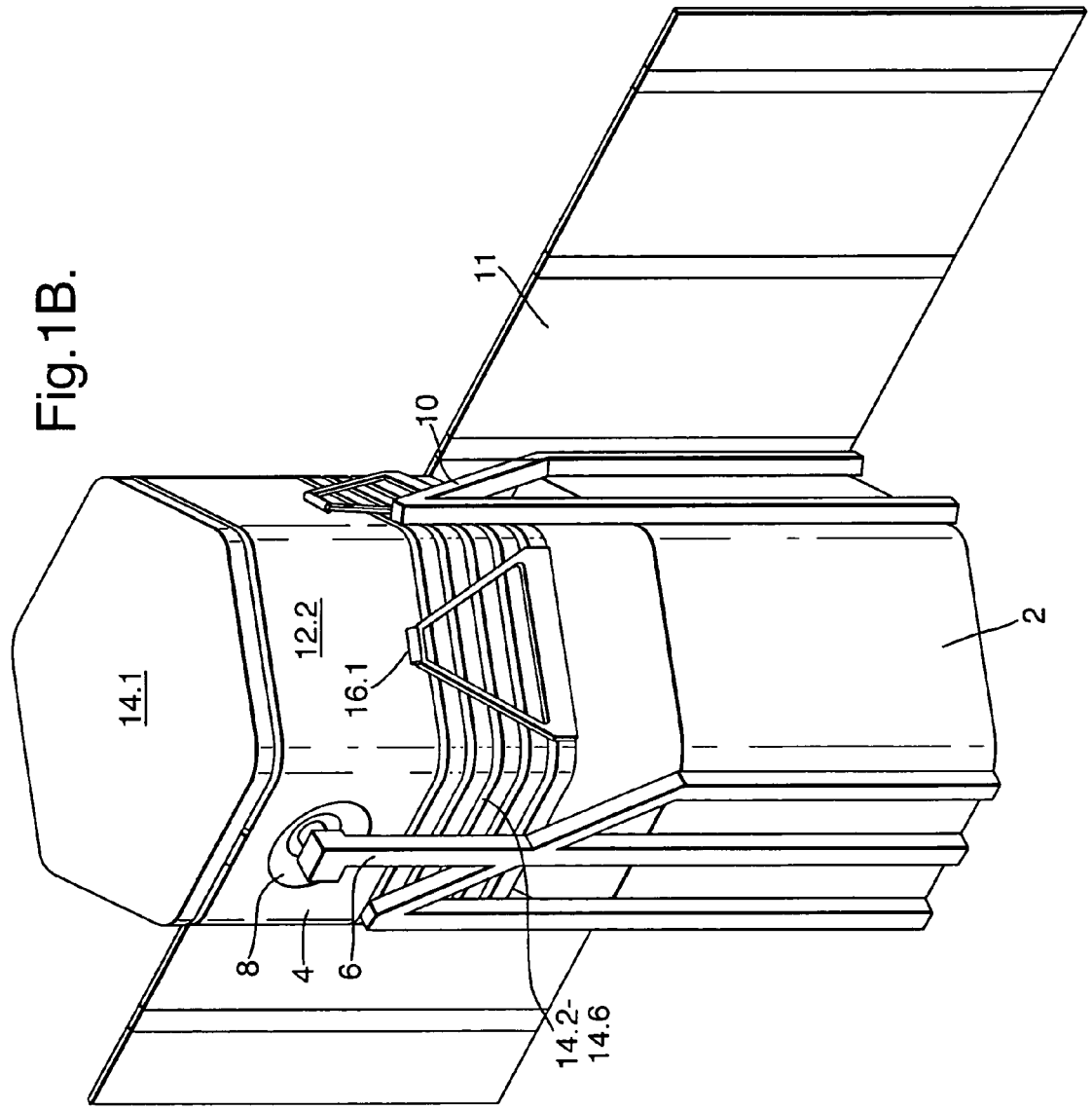

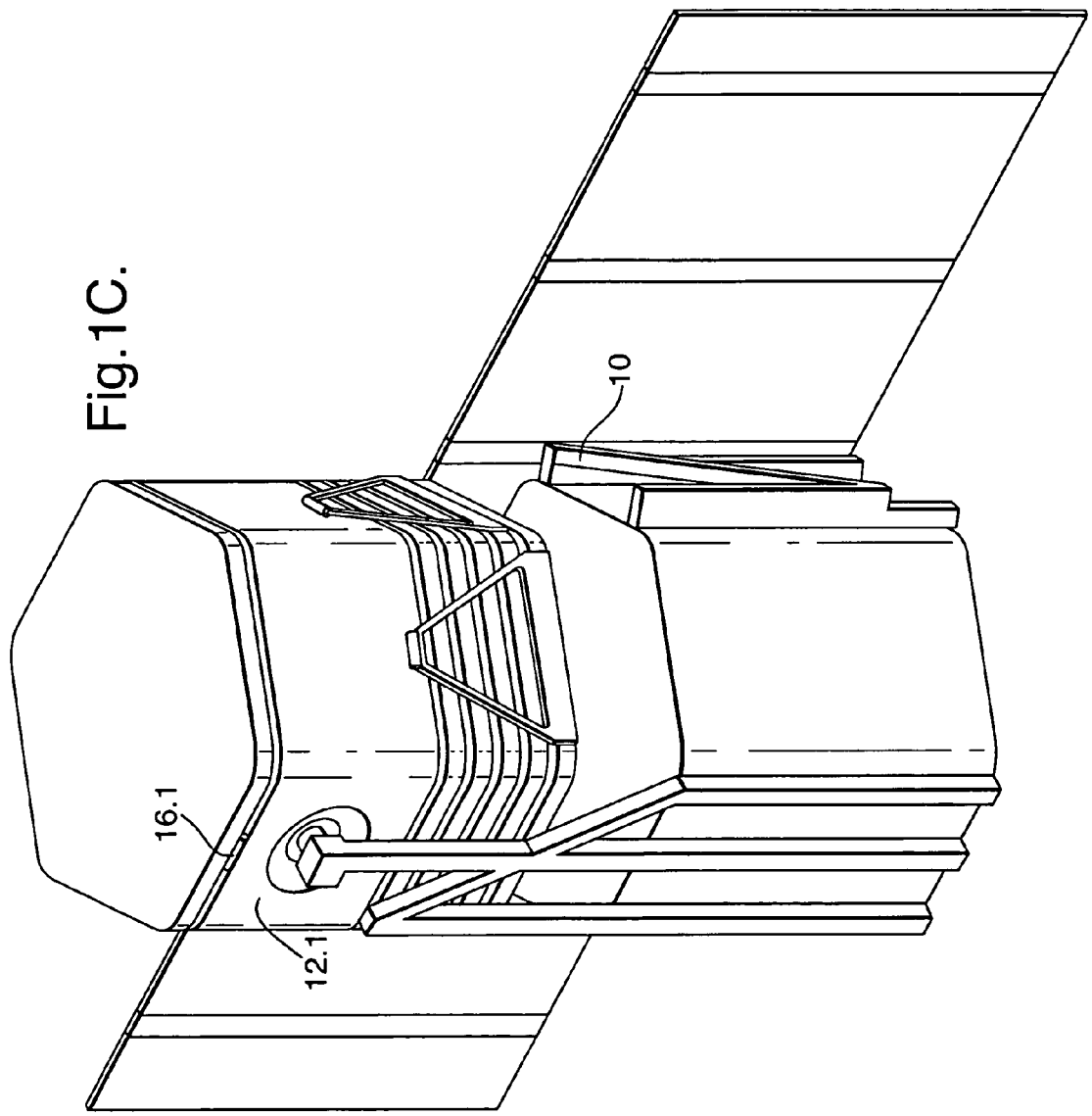

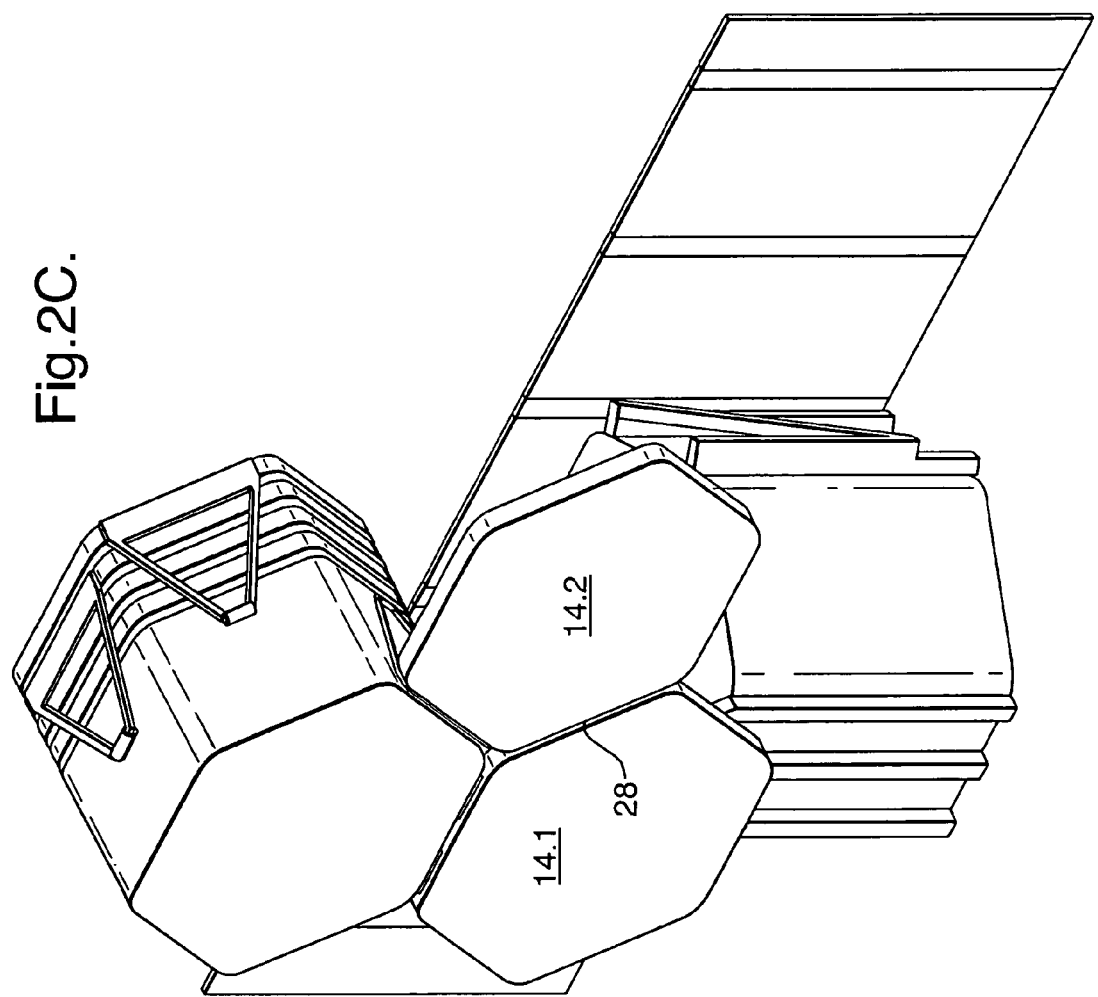

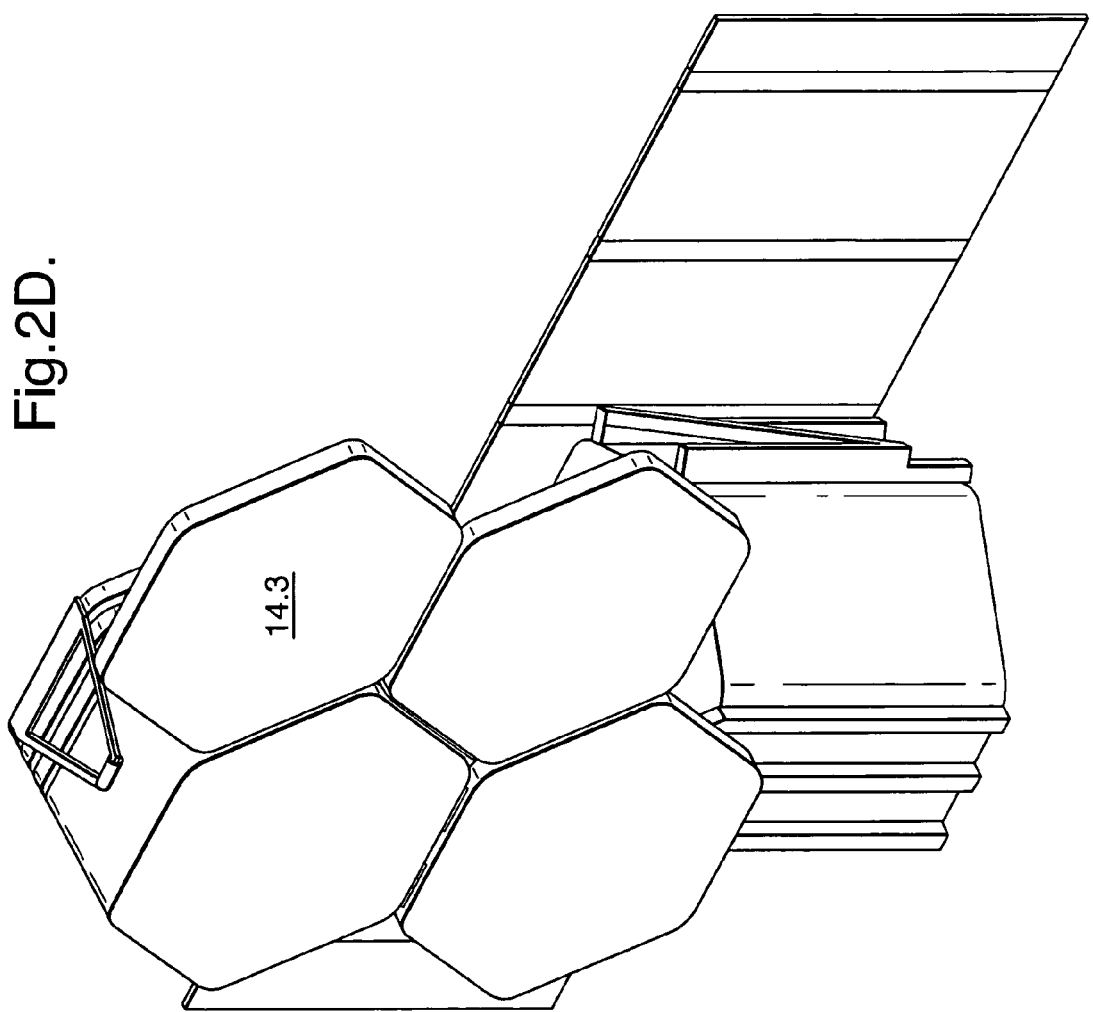

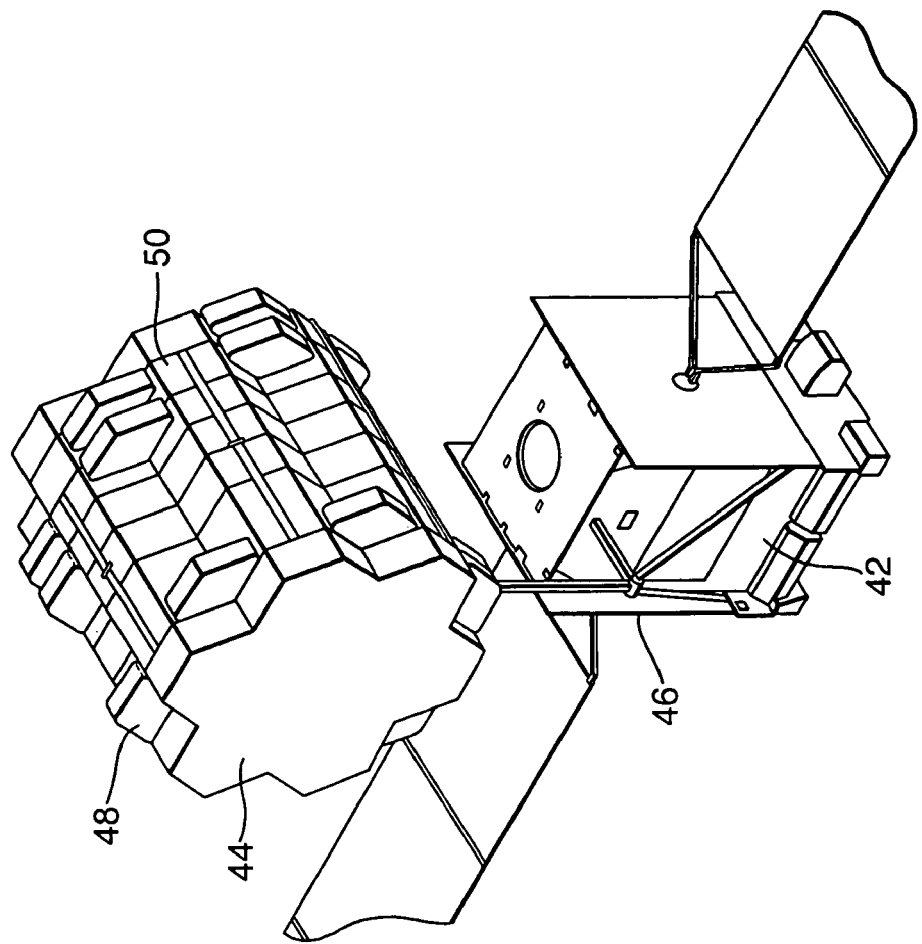
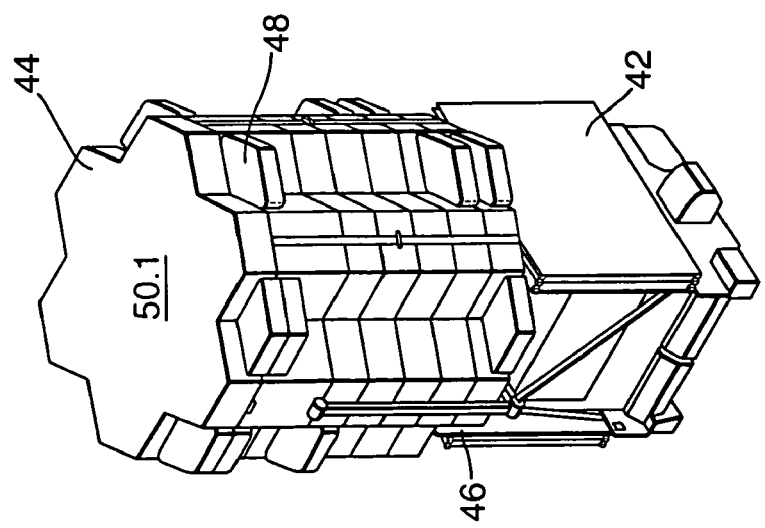

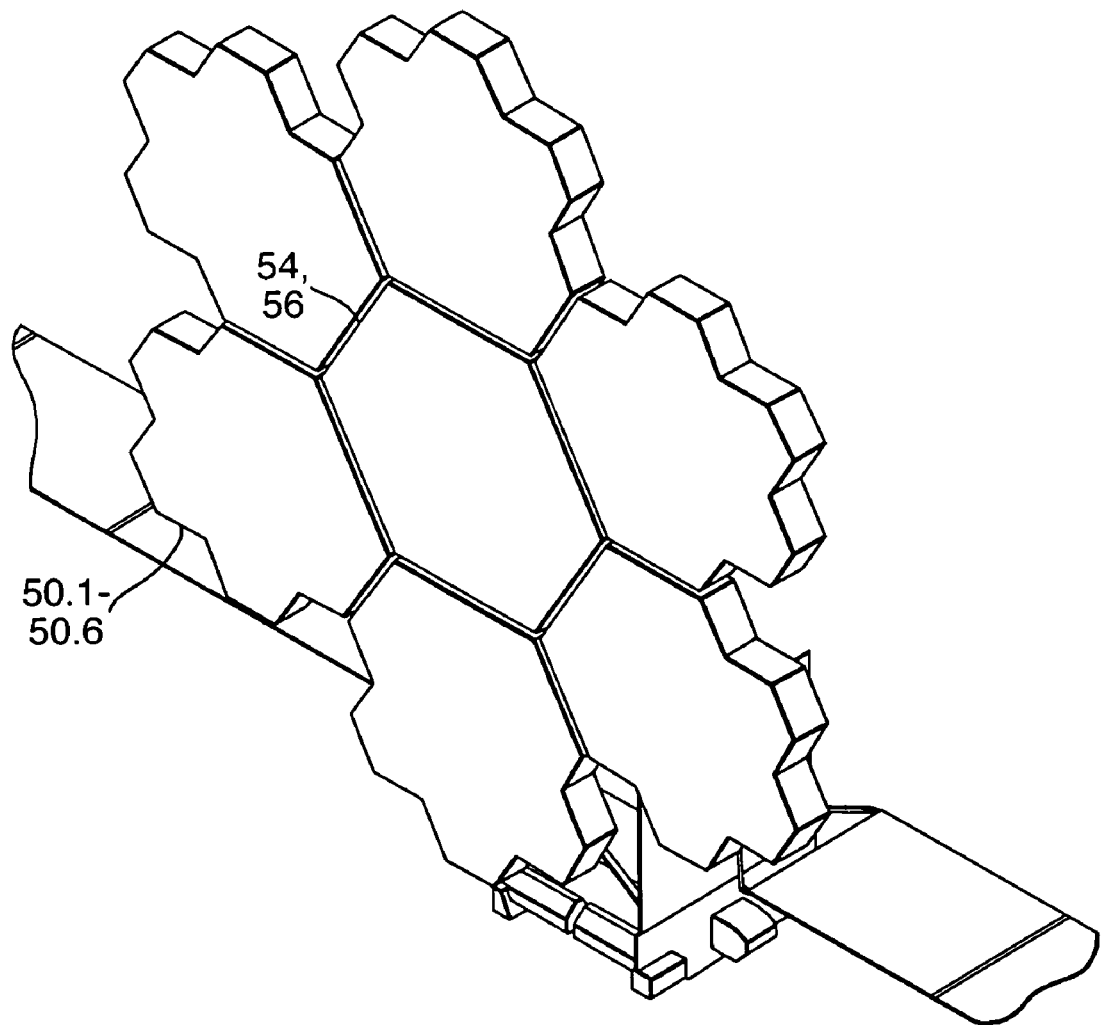

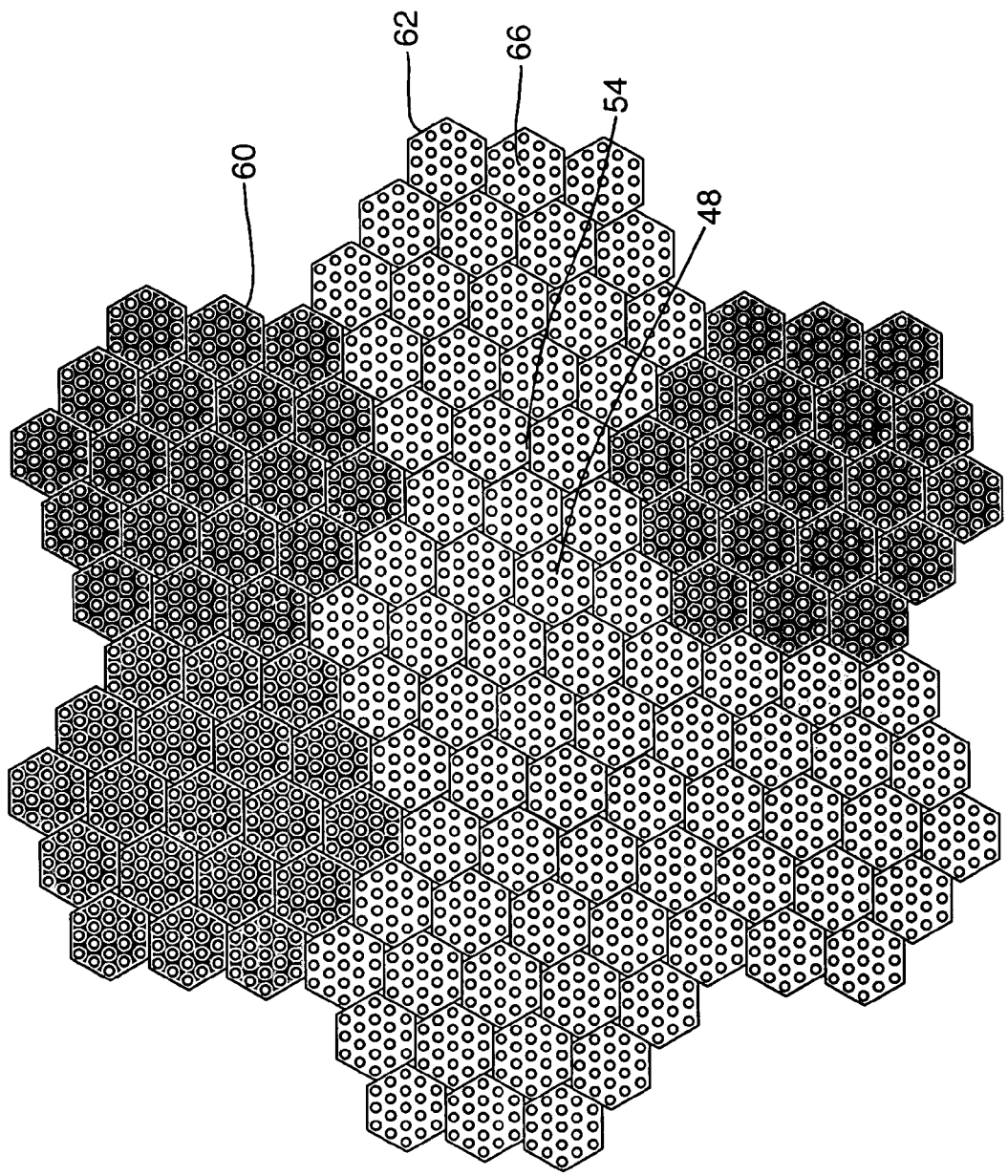

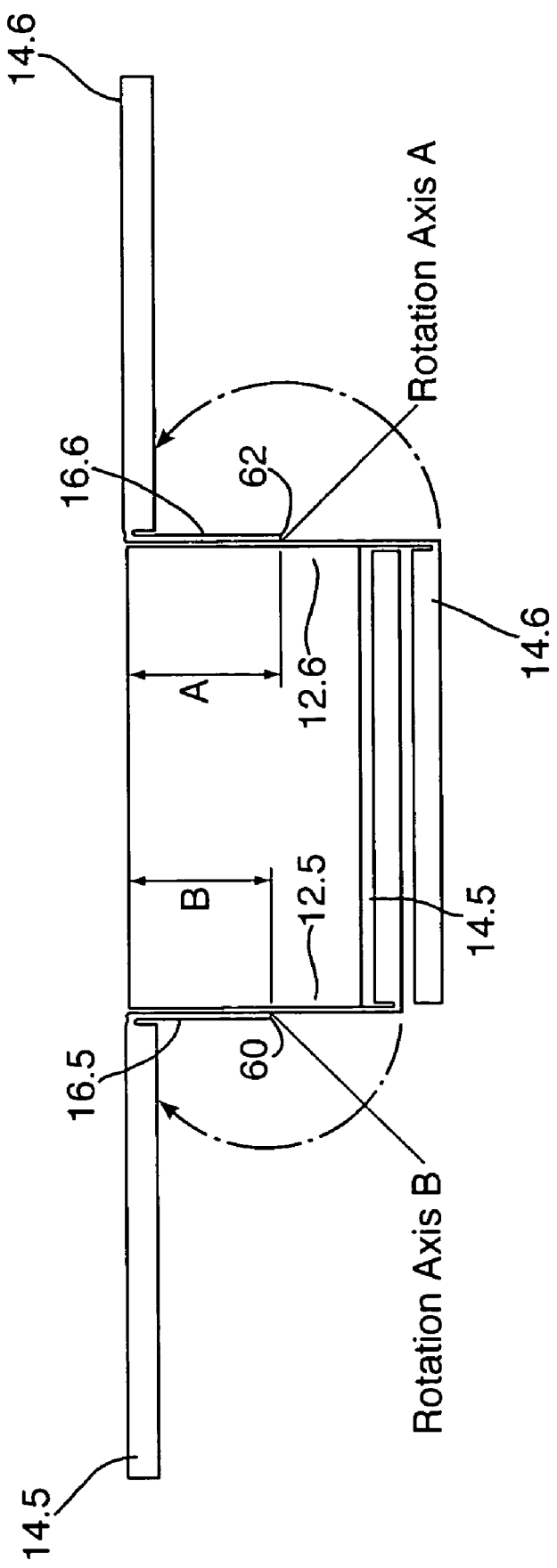

PHASED ARRAY ANTENNA

This invention relates to a phased array antenna, particularly though not exclusively, for use with telecommunications satellites.

BACKGROUND ART

Antenna structures onboard telecommunication satellites commonly include rigid reflectors, up to around 2.5 meters diameter, or more complex structures, for example unfurlable wire mesh reflectors up to 9 meters across. The array may operate as a transmit only, a receive only, or as a combined transmit/receive antenna.

Phased array antennas are in general use as compact, stationary structures for the flexible direction of electromagnetic energy for multi-beam, fast reaction tracking radar and telecommunications antennas. They are mechanically static but which can be electronically reconfigured to transmit or receive signals over a defined coverage region. For example ground based satellite terminals use phased arrays for tracking and communicating with satellites in low earth orbit, and flat plate phased array antennas are used for reception of satellite direct to home TV broadcasts.

Phased array antennas are used as an alternative to conventional reflector antennas onboard communications spacecraft. Examples include the Boeing Gapfiller military satellite, which uses fixed (non-deployable) separate receive and transmit X-band arrays (http://www.boeing.com/defense-space/space/bss/factsheets/702/wgs/wgs factsheet.html) and the Boeing Spaceway commercial satellite system, which uses which uses fixed Ka band phased arrays (http://www-.boeing.com/ids/allsystemsgo/issues/vol1/num3/story06.html). These antennas are of relatively small aperture and are fixed structures.

SUMMARY OF THE INVENTION

In at least a preferred embodiment, a deployable planar phased array antenna system for a telecommunications satellite is of a large aperture design and is deployed after the satellite is on-station in space. The larger aperture facilitates the generation of smaller diameter spot beams on the earth's surface, enabling system capacity to be increased through higher orders of frequency re-use. The smaller beam size also corresponds with an increase in the satellite transmitter EIRP (Effective Isotropic Radiated Power) and receiver sensitivity permitting operation with small, low power, lower cost terminals.

The present invention provides in a first aspect a phased array antenna, deployable from a retracted condition to a deployed condition, comprising a base member having, at least in part, a polygonal cross-sectional form defined by a plurality of edge regions, and a plurality of antenna panels, each antenna panel being connected, by a respective hinge means, to a respective one of said edge regions of said base member, such that, in said retracted condition, two or more of the antenna panels are stacked one on top of the other on the base member, and the hinge means being such that the antenna panels can be hinged sequentially one after the other from the stack to a position in which each panel is adjacent a respective base edge region to provide said deployed condition wherein the phased array antenna provides an extended area.

The top surface of the base member preferably provides a further antenna panel. In order for the antenna to function correctly, the panels and base member may preferably present a flat two dimensional surface, otherwise undesirable phase increments may arise between radiator elements. The upper surfaces of the panels may be aligned with the upper surface of the base member in the deployed condition; minor steps or discontinuities may however be corrected by signal processing.

The polygonal cross-sectional shape may be of any shape, but is preferably regular. It may be triangular, rectangular, pentagonal, etc, but in one preferred form, from electrical considerations of antenna design, is hexagonal, with six sides. The antenna panels may have the same cross-section as the base member, and are stacked on top of the base member so as to present a uniform cross-section in a lengthwise direction. This is particularly desirable where the antenna forms part of a telecommunications satellite that has to be launched through the earth's atmosphere. The panels may however have different cross-sections if necessary. In one preferred form, the outer edges of each panel have a castellated form, so that sub-arrays of radiator elements may have an optimum configuration.

As preferred, the panels are shaped and dimensioned that in the deployed condition, edges of the panel are coterminous with the respective base edge region. This permits electrical continuity of the antenna, and permits electrical connections to be made across the edges. Edges of each panel extending from the base edge region may be positioned next to the corresponding edge of an adjacent panel; in this way, the area of the antenna as deployed is closed.

In an alternative construction, an additional set of antenna panels may be provided, each additional antenna panel being hinged to one of the above first mentioned antenna panels, so that when the antenna panels are deployed from the retracted condition, firstly a first antenna panel is moved to the deployed position, and subsequently the additional antenna panel is pivoted from a position lying on top of the first panel to a deployed position. In this way, an antenna with a very large area may be provided.

In the deployed position, the antenna provides preferably, roughly a circular closed area, so that the antenna provides an optimally large aperture.

In a preferred manner of hinging the first antenna panels, each antenna panel is coupled to the base member by means of a hinge means having a pivot point that is positioned relative to the position of the antenna panel in the retracted stack of antenna elements, so that the antenna panel upon rotation of the hinge to the deployed condition, makes a 180° rotation and a translatory movement to the plane at the top of the base member in the fully deployed position.

The hinge is preferably of a "back-flap" construction, with a support frame extending from the pivot point over the underside of the panel member; in this way, it does not interfere with the electrical characteristics of the antenna. The pivot of the hinge is preferably formed as an elongate sleeve and pin arrangement, to ensure that the pivot point remains accurately positioned throughout.

The stack of antenna panels may comprise all of the panels to one side of the base member. Alternatively one or more antenna panels may be disposed when retracted on the opposite side of the base member. This may be the case where the antenna is intended for a telecommunications satellite, where the base member is coupled to a service module by means of a boom member, in order to avoid collision with the boom member.

In a preferred configuration, the antenna is disposed on top of the satellite service module during the launch phase, but when the satellite is on-station, then the antenna is rotated through 90°, in its retracted condition, by means of the boom member, to a position where the antenna is deployed. In this condition, the whole service module, including the deployed solar arrays, is able to rotate relative to the antenna (once every 24 hrs). Such an arrangement is known and is for example described in Communications Satellites, The Technology of Space Communications, Published 1987 by Heinemann, Author J. L. Blonstein, page 147. The antenna points at the earth while the service module solar arrays point at the sun. The solar arrays are fixed to the service module and do not rotate relative to the service module. In the preferred configuration, the base unit has to rotate 90° relative to the boom arm connecting it to the service module before the stowed panels can be deployed. The boom arm blocks the deployment of one panel from the rear of the base unit. The simplest arrangement is to have the "missing" panel fold directly from the front face of the base unit. More panels could be stacked on the front face of the base unit but the backflap hinge design means that mechanical hinge parts (possibly electrically conductive) would project in front of the antenna active surface, thereby disrupting the radiation pattern. It is the projection of mechanical parts in front of the antenna aperture that this invention avoids.

In a further aspect, the invention provides a telecommunications satellite comprising a service module and a phased array antenna coupled to the service module by means of a boom member, the service module including solar panels, and the phased array antenna being deployable from a retracted condition to a deployed condition, wherein in the retracted condition, the antenna is positioned on top of the service module, and the boom member including rotatable means so that the antenna, when deployed, can be rotated relative to the service module, and the antenna comprising a plurality of antenna panels, such that, in said retracted condition, two or more of the antenna panels are stacked one on top of the other, wherein for deployment, the antenna is firstly moved by means of the boom member to a position away from the service module, and then the antenna panels are moved to a deployed condition wherein the phased array antenna provides an extended area.

For each antenna panel, the upper surface of the panel, together with the top surface of the base member, provide an array of radiator elements of the phased array antenna. The radiator elements may be arranged in subarrays having a certain geometric shape. The outer edges of each panel have a castellated form, so that sub-arrays of radiator elements may have an optimum hexagonal configuration. The sub arrays may extend over the edges of the panels onto the base member and adjacent panels as required.

The lower surface of each panel has appropriate electrical conductors and components for coupling the radiator elements. Such conductor tracks are coupled to the base member, across adjoining edges, through appropriately designed electrical contacts in the deployed condition. For example the adjacent edges of each panel member and the base member may have protruding electrical contacts that are spring loaded, or of cantilever design for example, so that they make contact with some spring force to maintain electrical contact. Alternatively they may make a snap fit connection. However, in practice, simple proximity (capacitive) connections may be sufficient at Ka band frequencies. The advantage with the hinge construction of the present invention is that it confers great mechanical rigidity to the positioning of the deployed panel relative to the base unit. This facilitates a number of multi-pin connector schemes because of the precision with which the male and female parts can be aligned.

BRIEF DESCRIPTION OF THE DRAWINGS

Preferred embodiments of the invention will now be described with reference to the accompanying drawings wherein:—

FIGS. 1A, 1B and 1C are perspective views of a first embodiment of the invention comprising a spacecraft with a deployable antenna in a retracted condition, and with solar panels in furled and unfurled conditions;

FIGS. 2A to 2G are perspective views showing sequential steps in the deployment of the antenna;

FIGS. 3A to 3C are perspective views of a second embodiment of the invention with FIG. 3A showing the antenna of the telecommunications satellite in a retracted position, FIG. 3B showing the antenna in a raised position from the body of the satellite, and FIG. 3C showing the fully deployed antenna array;

FIG. 4 is a plan view of the deployed array showing the antenna panels forming a roughly circular closed surface;

FIG. 6 shows, in schematic form, a cross-sectional view of a central base unit with antenna panels connected to the central unit by hinges.

DESCRIPTION OF THE PREFERRED EMBODIMENTS

Figure 1A:
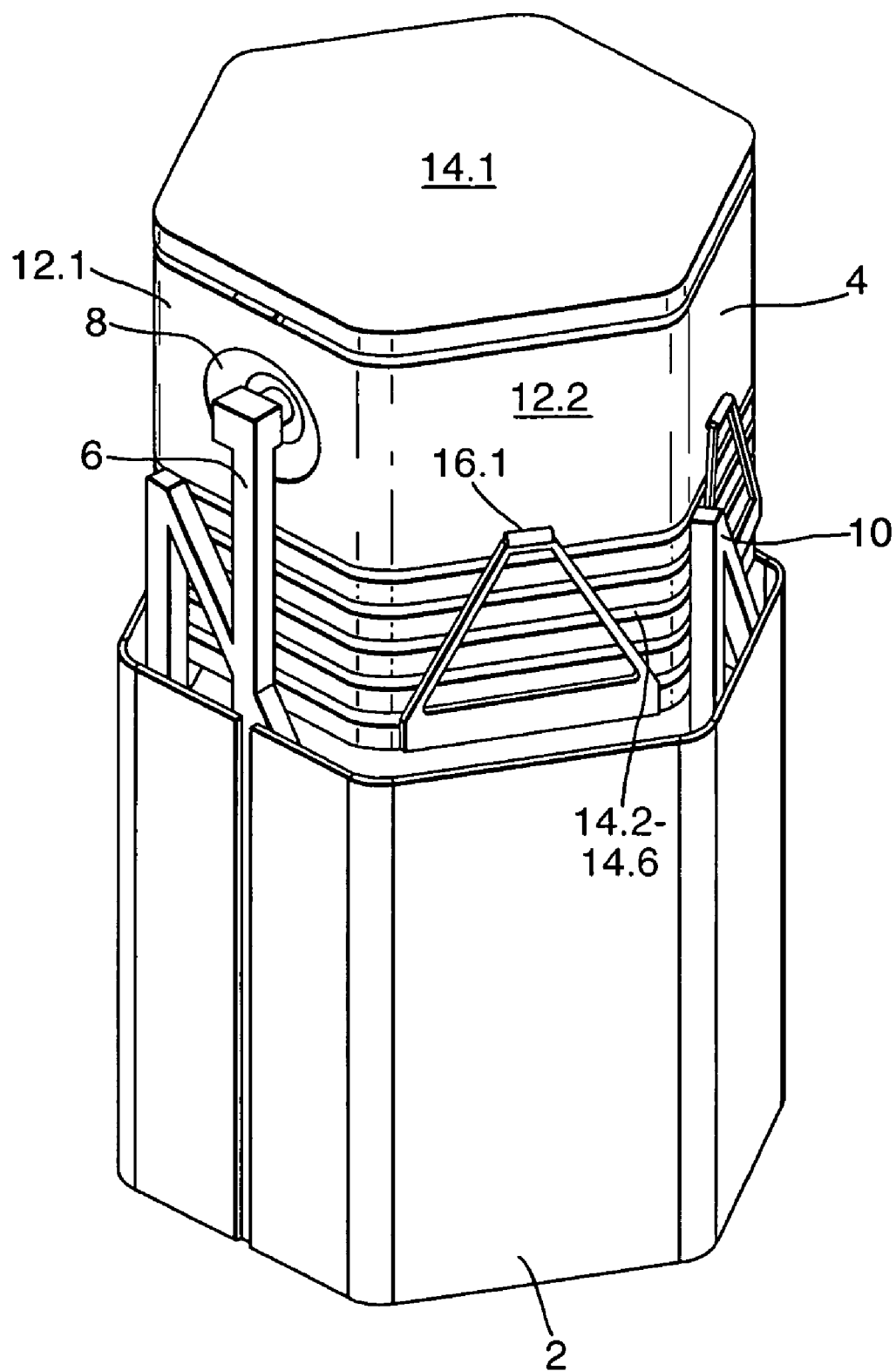

In the preferred embodiments of the invention, a phased array antenna comprises a number of antenna panels, which are hinged together and folded when stowed prior to deployment. On deployment the array is unfolded to form a continuous large planar antenna aperture. Each antenna panel comprises a multiplicity of active antennas. The composition of each of these active antennas depends on the functioning of the array, transmit/receive, receive only, transmit only.

Referring now to FIGS. 1 and 2, a first embodiment comprises a telecommunications satellite having a service module body 2 and a deployable antenna 4 that is positioned in a retracted condition coaxial with the body 2.

Both the body and the antenna are of hexagonal cross section. The antenna is mounted to the body by means of a boom 6. Boom 6 is coupled to antenna 4 through a swivel joint 8 that permits rotation in two planes, as will become apparent. Stay members 10 are provided for holding the antenna in the position shown. The service module body 2 has solar panels 11.

The antenna comprises a base member 12 and a stack of individual antenna panels 14, one antenna panel 14.1 being mounted on top of the base 12 and the remaining five antenna panels 14.2 to 14.6 being mounted beneath the base 12. The cross sectional shape of base 12 is defined by sides or edge regions 12.1 to 12.6. Each panel is mounted to a respective side of base 12 by a respective hinge 16.1 to 16.6. Each hinge has a pivot 18 secured to a side of the base and comprising an extended sleeve containing a rotatable pin (not shown). A frame 20 extends from the rotatable pin to the respective panel 14. The frame is angled with a quadrilateral section as shown, and a further quadrilateral section may be secured to the rear side of the antenna panel (not shown).

As shown in FIG. 1, in initial steps, before antenna deployment, solar panels 11 are firstly unfurled, as shown in FIG. 1B, to a fully extended position, and then stay members 10 fall away, as shown in FIG. 1C.

Figure 2A:
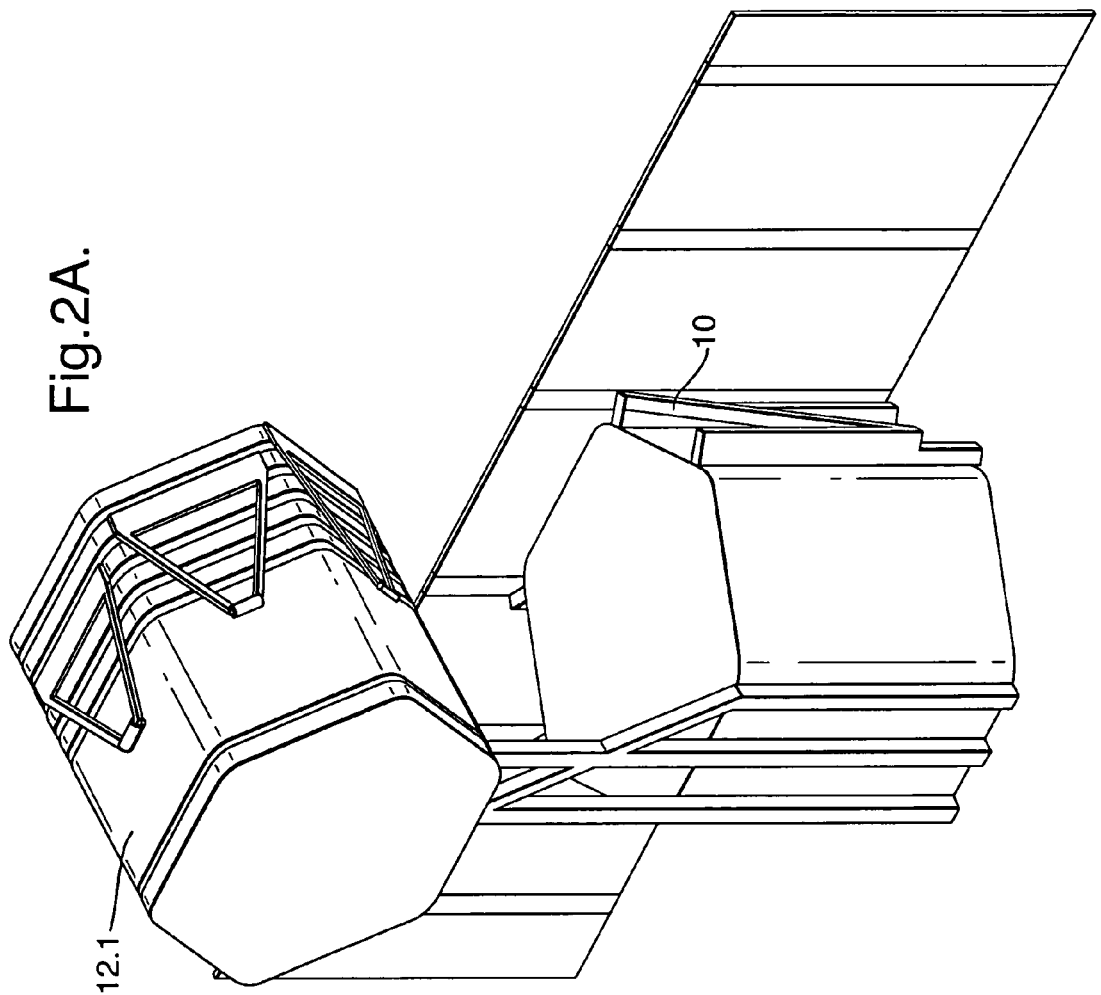

As shown in FIG. 2, the method of deploying the antenna is firstly to move the retracted antenna stack 4 to a position raised from the body 2 and rotated through 90°, by means of swivel joint 8 attached to boom 6 (see FIG. 1A, FIG. 1B and FIG. 2A).

Figure 2B:
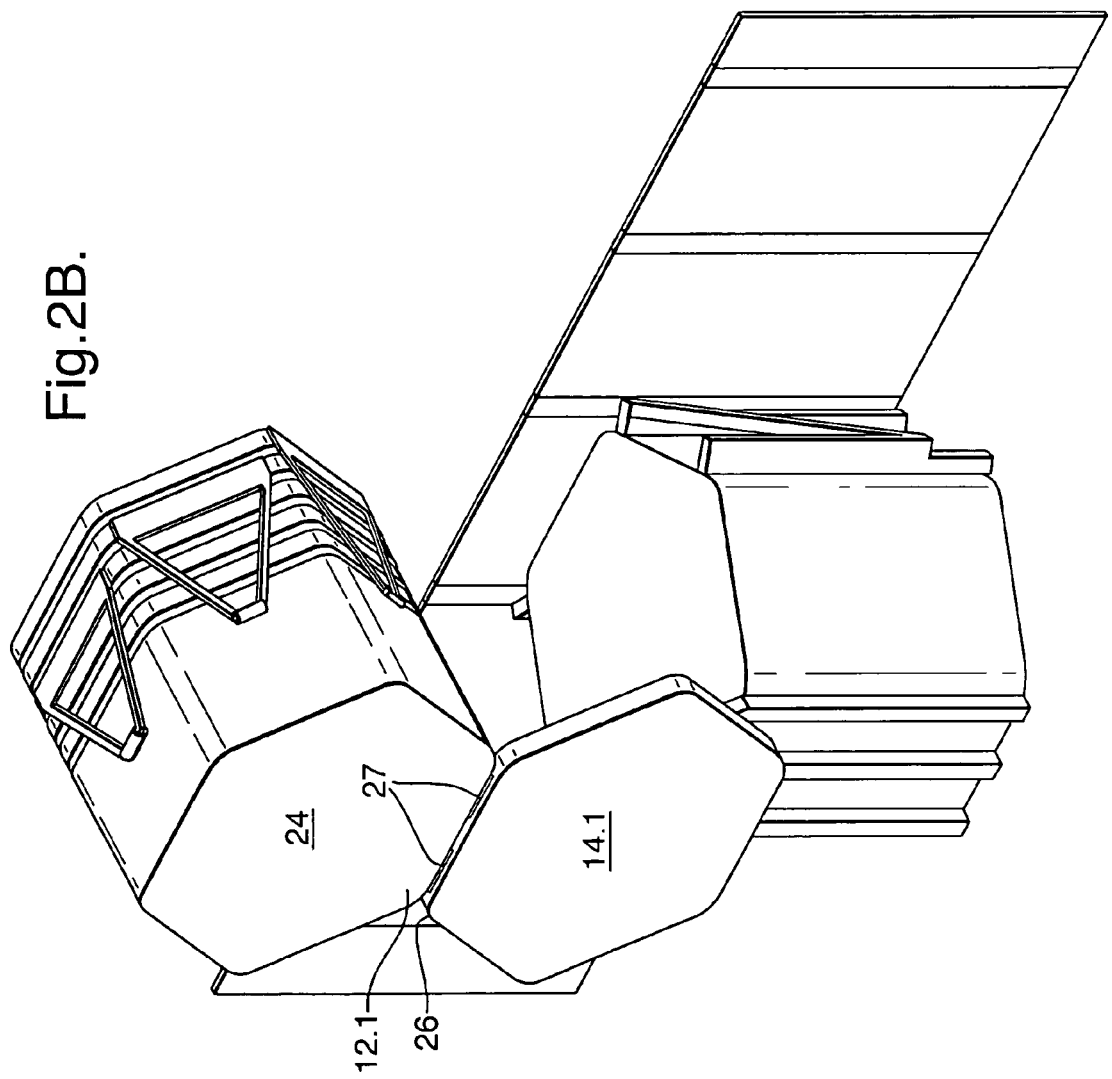
Figure 2E:
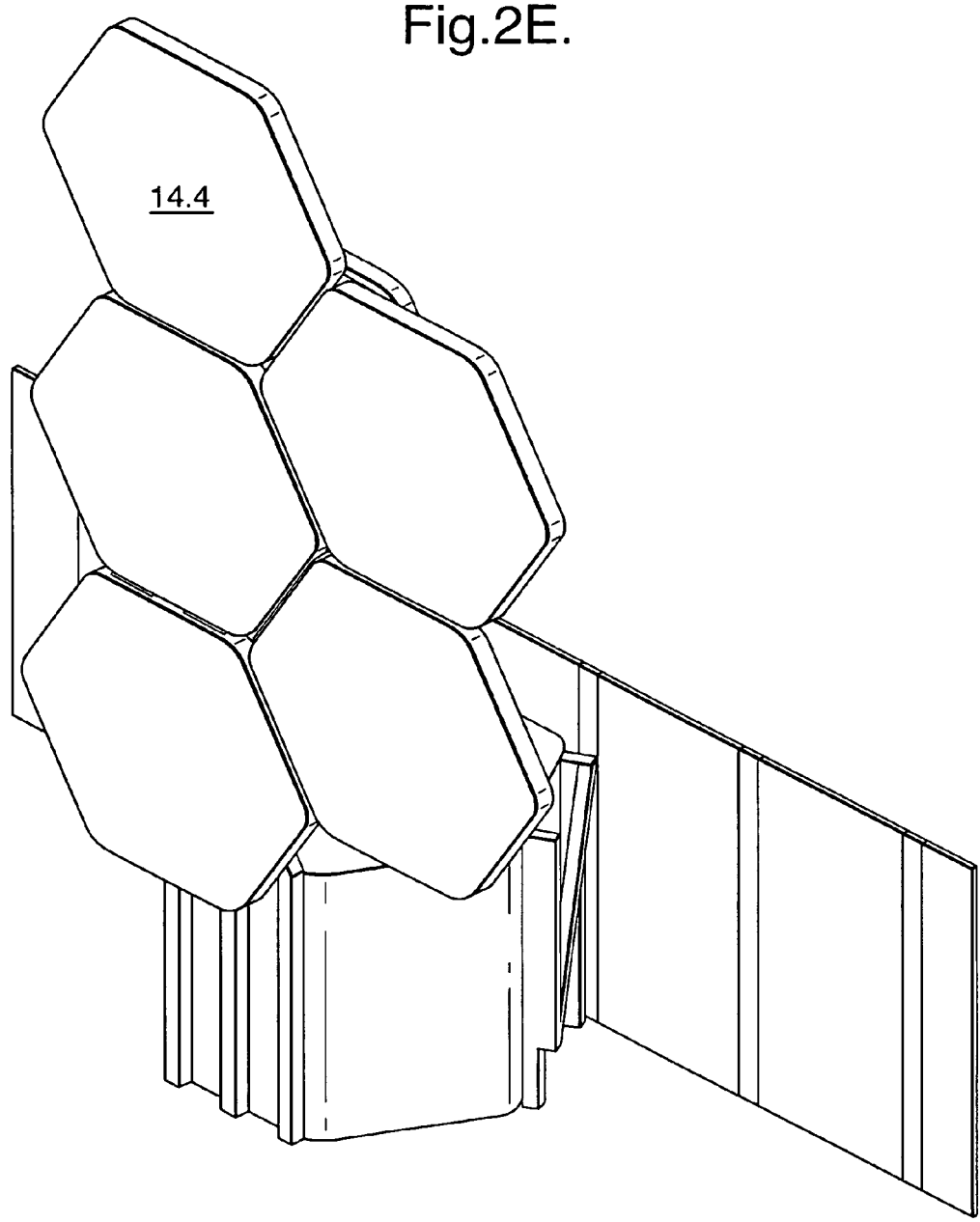
Figure 2F:
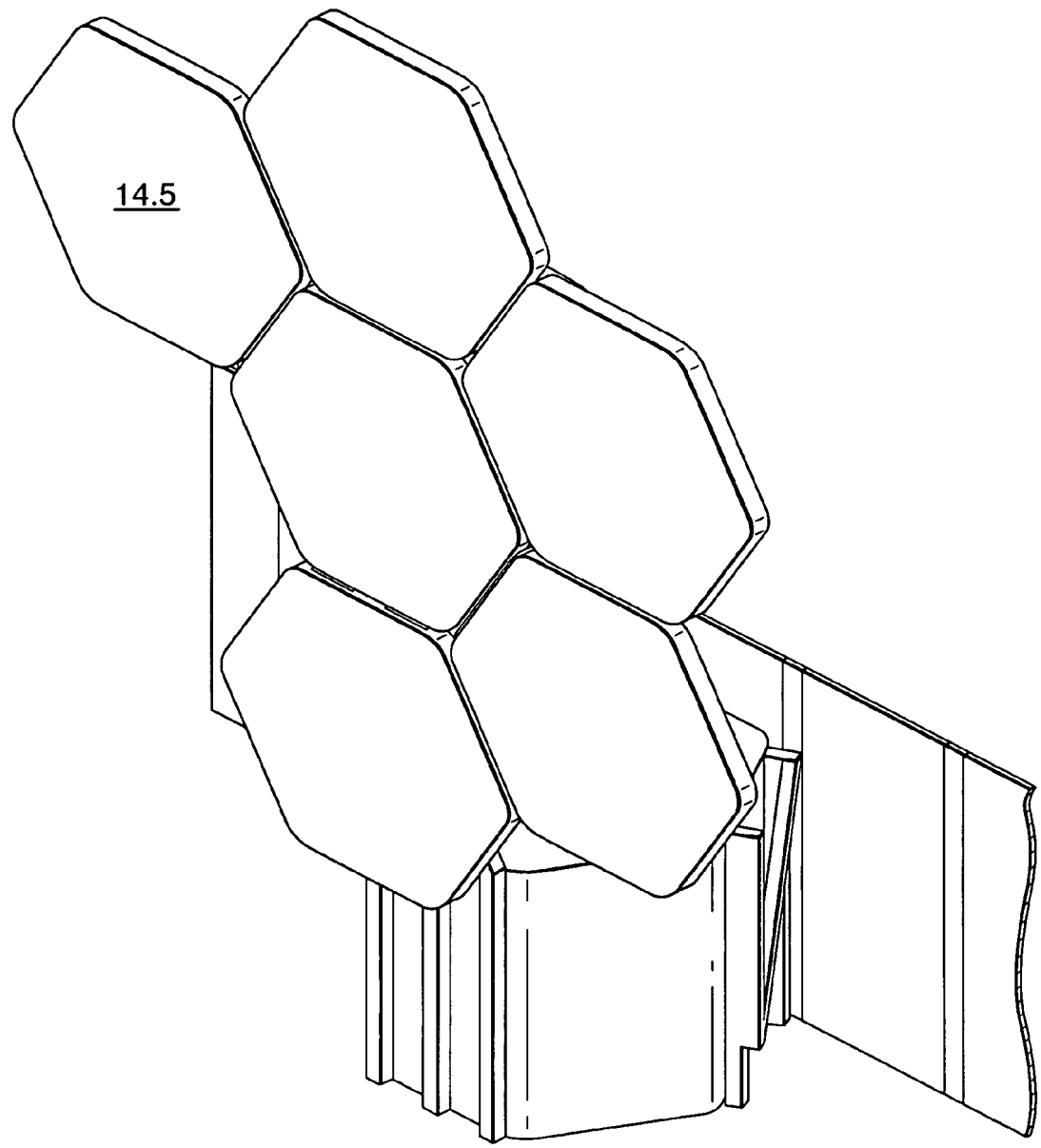
Figure 2G:
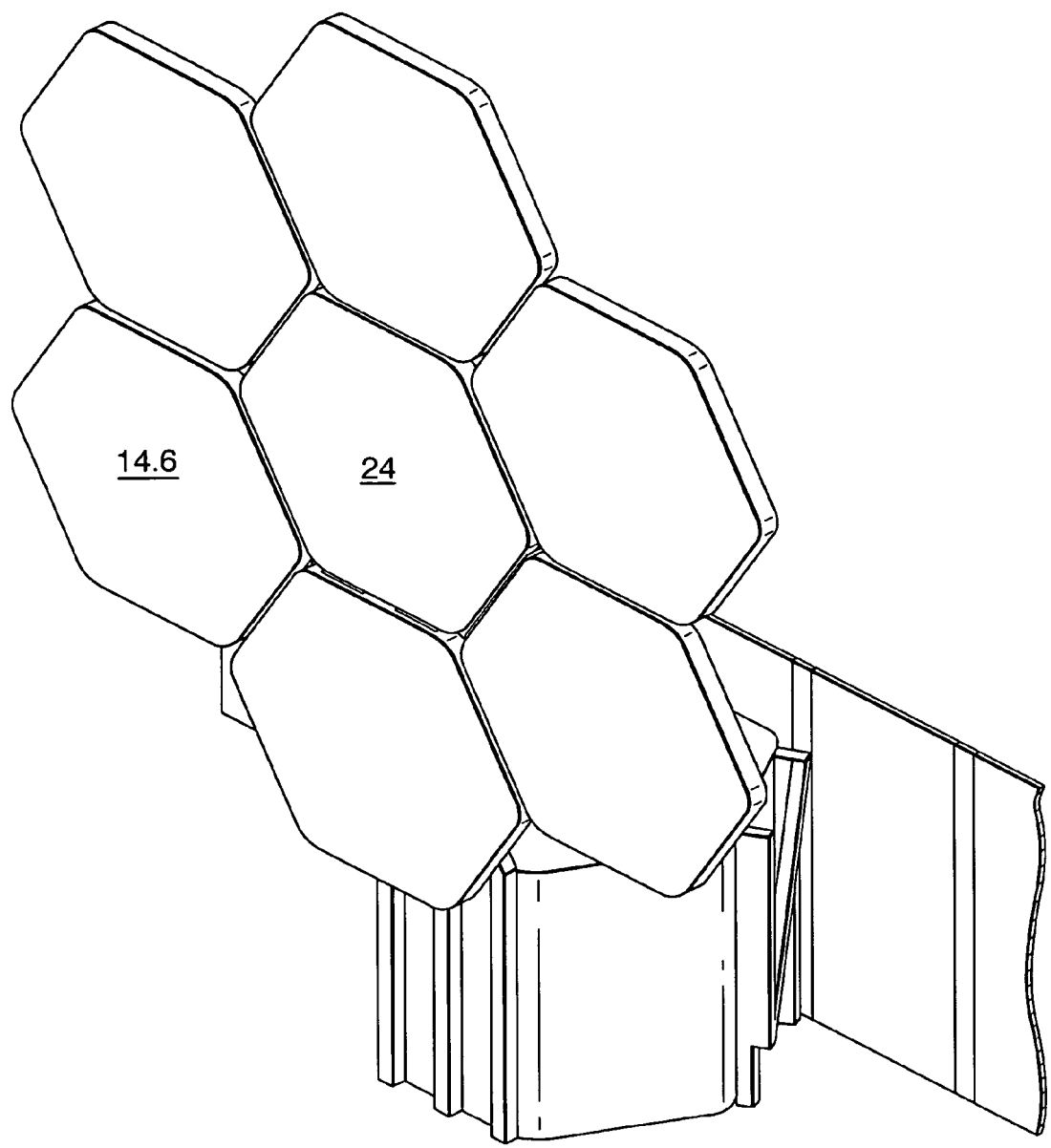

As shown in FIG. 2B, a first antenna panel 14.1 that is initially positioned on top of body member 4, is hinged, by means of a hinge 16.1 (FIG. 1C) mounted to base edge region 12.1, to the position as shown wherein the panel 14.1 extends coplanar with the top 24 of the base and with the respective edges 12.1, 26 of the base and panel being located close together and coterminii with one another. In this position, electrical contacts 27, formed as proximity capacitive contacts, are disposed along the edges 12.1, 26 are electrically coupled. It will be noted that panel 14.1 is mounted on top of base member 4, since otherwise boom member 6 would be positioned across the active surface of the antenna panel, and degrade the antenna characteristics.

Then, as shown in FIGS. 2C to 2G, the antenna panels from the stack behind the base are sequentially hinged to positions coplanar with panel 14.1 and located against sequential edges of the base member 12. The side edges 28 of each panel extending from the base are located coterminii with adjacent edges 28 of adjacent panels. The result is, in the fully deployed condition shown in FIG. 2G, a pattern of hexagons, seven in number including base top 24, that form a closed surface area that is very roughly circular in outline and which provides an optimum configuration for a phased array antenna for telecommunications. Each upper surface of the antenna panels and the upper surface of the base carry arrays of radiator elements of the phased array antenna.

In the fully deployed condition, the swivel joint 8 permits the antenna and the service module to rotate relative to one another so that the solar cells are directed at the sun, whereas the antenna remains directed at the earth. Such an arrangement is known and is for example described in Communications Satellites, The Technology of Space Communications, Published 1987 by Heinemann, Author J. L. Blonstein, page 147. The only rotation is between antenna and service module, with electrical power travelling along the boom arm that joins these two structures. Only one simple electrical rotating joint is required (+−DC, 50V, for example), compared with the dual complex rotational electrical connections between a pair of solar panels and a conventional satellite body. In the preferred configuration, the base unit has to rotate 90° relative to the arm connecting it to the service module before the stowed panels can be deployed. The arm blocks the deployment of one panel from the rear of the base unit. The simplest arrangement is to have the "missing" panel fold directly from the front face of the base unit.

Details of the hinge arrangements for the antenna panels are schematically shown in FIG. 6, wherein two antenna panels 14.5, 14.6 of the stack are connected by respective back flap hinge members 16.5, 16.6 to respective sides 12.5 and 12.6 of base unit 12. The pivot point of the hinge along the side of base unit 12 is different for each element, and for hinge 16.5 the pivot point is shown as at 60 and for hinge 16.6 the pivot point is shown as at 62. The precise position of the pivot point is dependent on the position of the panel in the stack so that when the hinging operation takes place, the panel hinges from the stack to a position adjacent the top edge of the base unit. Thus, each panel hinge has a unique offset dimension, being incremented relative to a hinge for an adjacent panel in the stack by half the thickness of the panel. Referring to FIG. 6, A−B=0.5 panel effective stowed thickness. The hinge construction ensures no hinge line in front of the aperture that would otherwise interfere with RF radiation. When the panels are in their deployed condition, electrical connectors along the coterminii edges of the panels and base member provide electrical coupling for the radiator elements (not shown). Simple robust hinge style offers precise edge alignment and inter-panel electrical interconnects, as described above.

Figure 5:
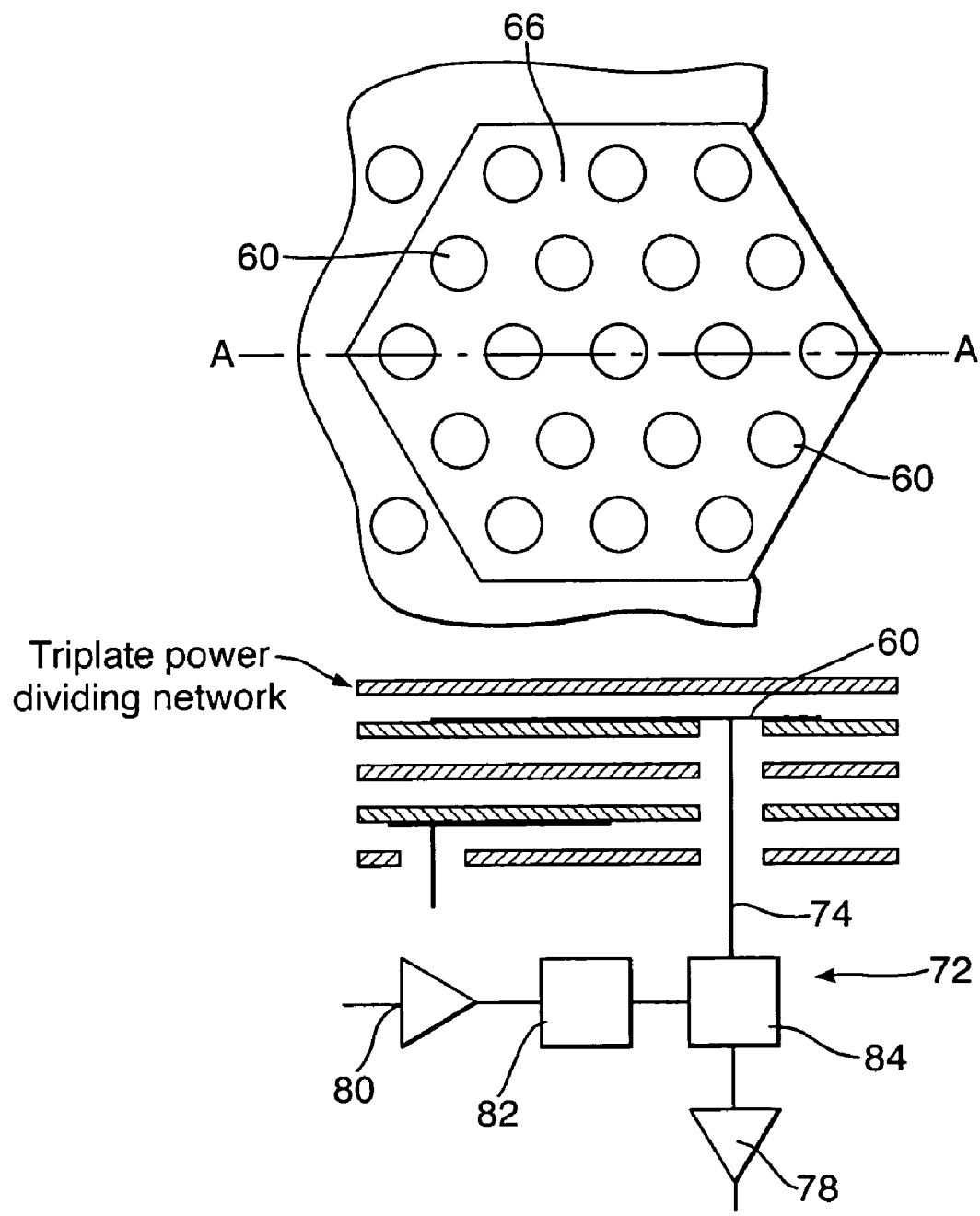
FIG. 5 shows constructional details of each antenna element.

Referring now to the second embodiment shown in FIGS. 3, 4 and 5, a telecommunications satellite comprises a service module body member 42 with an antenna 44 mounted coaxial with the body member 42 in a retracted condition, see FIG. 3A. A boom member 46 couples the antenna to the body member. The antenna comprises a base member 48, a stack of individual antenna panels 50 mounted on one side of base member 48, and a single antenna panel 50.1 mounted on the opposite side of the base member. As shown in FIG. 3B the first step in deploying the antenna is to move the antenna 44 by means of the boom 46 to a position rotated at 90° to body member 42. The antenna panels 50.1 to 50.6 are then sequentially hinged from the stack along the respective edges of the base member 48, so as to provide the configuration shown in FIG. 3C, in a similar manner to that described above with reference to FIG. 2. In particular, each panel 50 extends coplanar with the top of the base and with the respective edges 54, 56 of the base and panel are located close together and coterminii with one another. The side edges 58 of each panel extending from the base are located coterminii with adjacent edges 58 of adjacent panels. The configuration is more specifically shown in FIG. 4.

It will be noted that the antenna panels of the second embodiment are not regular hexagons but that their outer edges 60 have castellations 62. This permits as shown in FIG. 4 the phased array of radiating elements 64 to be arranged in hexagonal sub-arrays 66. Each sub-array 66 comprises nineteen radiating elements 64 arranged in a hexagonal configuration. The sub-arrays for each antenna panel occupy the outer castellations 62, and extend over into the adjacent edge regions 54 of the central base member 48 so as to preserve a regular hexagonal configuration. It may be seen that the central base member 48 also has a similar array of hexagonal sub-arrays 66. In the result an array of seven panels are provided each panel having a configuration of hexagonal sub-arrays, the sub-arrays all being of the same shape and size. The result is a phased array antenna of optimum configuration, having an approximately circular shape for large aperture, with the hexagonal arrays of radiator elements providing optimum beam forming characteristics.

When the panels are in their deployed condition, electrical connectors (not shown) along the coterminii edges of the panels and base member provide electrical coupling for the radiator elements. Simple robust hinge style offers precise edge alignment and inter-panel electrical interconnects.

Details of the construction of the radiating elements are shown in FIG. 5 wherein electronic circuits 72 are connected to each radiating element 60 through electrical conductors 74 extending perpendicular to the surface of the antenna panels. For a Transmit/Receive array, each sub array 66 comprises a set of 19 radiating elements, a power divider which enables these elements to be excited by a single source with defined power division ratios and relative phases, a low noise amplifier (LNA) 78 for low noise signal reception, a high power amplifier (HPA) 80 for signal transmission, a bandpass filter 82 for rejecting unwanted, out of band transmissions from the HPA, and a diplexer 84 for combining the reception and transmission paths into a common path for connection to the set of radiating elements, and a beam-forming network. For a transmit only array the LNA and diplexer are omitted. For a Receive only array, the HPA and bandpass filter are omitted, and the diplexer is replaced by a bandpass filter.

An antenna panel is a combination of a modular design (for the assembly of LNA, HPA, diplexer and filters) and single structural elements (for the antenna front face carrying the radiating elements, the beam-formers, heat pipes and supporting structures). This arrangement results in reduced cost (for the modular assemblies), and reduced mass overall through the use of single structural elements.

The phased array antenna of the invention, as described, provides the following advantages:

A large antenna aperture enables generation of small spot beams permitting a high order of frequency re-use and enhancement of system capacity. The small beams also enhance the transmitter EIRP, and receive sensitivity enabling operation with small, low power, low cost terminals.

A single phased array can replace a number of conventional reflector antennas. This feature provides the following benefits:

Lower total antenna mass. This translates into lower spacecraft launch mass with attendant cost savings. Alternatively the antenna mass saving could be used for incorporating additional utility.

More compact structure, and takes up less room than the reflector equivalents. Again this opens up the possibility of incorporating additional utility.

Replacement of multiple reflector antennas by a single phased array simplifies deployment.

Easier accommodation within the spacecraft launch vehicle.

Potential cost reductions (only one phased array antenna to replace a number of reflector equivalents).

A high degree of operational flexibility.

The coverage provided by the phased array antenna can be reconfigured to match changing traffic distributions or new mission requirements.

The array provides a method of adjusting the coverage to compensate for orbit inclination, thereby increasing the useful lifetime of the satellite and to compensate for satellite pointing errors.

A method of designing antennas such that only small changes to a generic design are required to customise the antenna for different missions.

Ability to compensate for antenna distortions, both during assembly, integration and test on the ground, and during operation in orbit.

Less susceptibility to scatter effects, and shadowing by spacecraft structures than for reflector equivalents.

The planar array can be a self-contained unit with active electronic units (HPAs and LNAs etc.) and filters integrated into the assembly. This enables the assembly, integration and test of the whole payload to be carried out more efficiently.

The antenna aperture can be used as a thermal radiator.

Having thus described the present invention by reference to preferred embodiments, it is to be appreciated that the embodiments are in all respects exemplary and that modifications and variations are possible without departure from the spirit and scope of the invention. For example, different shapes/sizes and/or a different number of antenna panels could be used in the invention so as to realise the technical effect of the invention. Furthermore, as well as applications onboard telecommunications satellites, the deployable phased array antenna of the invention could also be used for terrestrial communication systems in which a large phased array aperture is required but which must be transportable or easy to relocate.

The invention claimed is:

1. A phased array antenna, deployable from a retracted condition to a deployed condition, comprising a base member having, at least in part, a polygonal cross-sectional form defined by a plurality of edge regions, and a plurality of antenna panels, each antenna panel being connected, by a respective hinge means, to a respective one of said edge regions of said base member, such that, in said retracted condition, two or more of the antenna panels are stacked one on top of the other on the base member, and the hinge means being such that each antenna panel can be rotated sequentially one after the other, around a single pivot point for each respective hinge means, from the stack to a position in which each panel is adjacent a respective base member edge region to provide said deployed condition wherein the phased array antenna provides an extended area.

2. An antenna according to claim 1, wherein each antenna panel is generally the same cross-sectional shape as said base member.

3. An antenna according to claim 2, wherein each antenna panel is hexagonal in shape.

4. An antenna according to claim 2, wherein outer edges of each antenna panel, when deployed, are castellated in form.

5. An antenna according to claim 1, wherein at least one antenna panel is mounted on the opposite side of the base member to said stack in the retracted condition.

6. An antenna according to claim 1, wherein the antenna panels are arranged such that when each panel is rotated from the stack to the fully deployed position an edge of the panel is located adjacent to and coterminii with a respective edge of the base member.

7. An antenna according to claim 1, wherein side edges of each deployed panel extending from the base member are adjacent respective side edges of adjacent panels.

8. An antenna according to claim 1, wherein each antenna panel is coupled to the base member by means of a back flap hinge, having a pivot comprising an extended sleeve and rotatable pin therein, and a frame extending from said pin and secured to the rear side of the antenna panel.

9. An antenna according to claim 1, wherein each antenna panel is coupled to the base member by means of a hinge on a side of the base unit wherein the pivot point of the hinge along the side of the base unit is different for each panel with the position of the pivot point being dependent on the position of the panel in the stack so that when the hinging operation takes place the panel hinges from the stack to a position in the deployed condition is coplanar with the other antenna panels.

10. An antenna according to claim 9, wherein the mounting point of the hinge is incremented for sequential panels in the stack, by half the thickness of the antenna panel in the stack.

11. An antenna according to claim 1, including electrical connector means disposed along adjacent edges, in the deployed condition, of each panel and said base member, in order to make electrical connection between the base member and elements of the antenna within each panel.

12. An antenna according to claim 1, wherein radiating elements of the phased array are arranged in regularly configured sub-arrays.

13. An antenna according to claim 12 wherein the outer edges of each panel in the deployed condition are castellated, and the sub-arrays extend into the castellations, with sub-arrays adjacent the base member extending over the edges of the base member.

14. An antenna according to claim 1, wherein the upper surface of the base member provides a central antenna panel.

15. A phased array antenna according to claim 1, incorporated in a telecommunications satellite, the satellite having a service module including solar cell panels, and the antenna being coupled via a rotatable joint to a boom member that is mounted to the service module, to permit relative rotation of the antenna and service module in the deployed condition.

16. A phased array antenna according to claim 15, wherein at least one antenna panel is mounted on the opposite side of the base member to said stack in the retracted condition, to permit deployment in front of said boom member.

17. A telecommunications satellite comprising a service module and a phased array antenna coupled to the service module by means of a boom member, the service module including solar panels, and the phased array antenna being deployable from a retracted condition to a deployed condition, wherein in the retracted condition, the antenna is positioned on top of the service module, and the boom member including rotatable means so that the antenna, when deployed, can be rotated relative to the service module, and the antenna comprising a plurality of antenna panels, such that, in said retracted condition, two or more of the antenna panels are stacked one on top of the other, wherein for deployment, the antenna is firstly moved by means of the boom member to a position away from the service module, and then the antenna panels are rotated to the deployed condition wherein the phased array antenna provides an extended area.

18. A satellite according to claim 17, wherein said antenna includes a base member to which said boom member is mounted, said stack being mounted on one side of said base member, and in which at least one antenna panel is mounted on the opposite side of the base member to said stack in the retracted condition, to permit deployment in front of said boom member.

* * * * *